United States Patent
Wu et al.

(10) Patent No.: US 12,475,088 B2
(45) Date of Patent: Nov. 18, 2025

(54) DATA QUALITY CHECK USING A STRUCTURED QUERY LANGUAGE HINT

(71) Applicant: eBay Inc., San Jose, CA (US)

(72) Inventors: Shaojie Wu, Shanghai (CN); Liming Zhu, Shanghai (CN); Geng Zhu, Shanghai (CN)

(73) Assignee: eBay Inc., San Jose, CA (US)

( * ) Notice: Subject to any disclaimer, the term of this patent is extended or adjusted under 35 U.S.C. 154(b) by 25 days.

(21) Appl. No.: 18/362,882

(22) Filed: Jul. 31, 2023

(65) Prior Publication Data
US 2025/0045257 A1 Feb. 6, 2025

(51) Int. Cl.
*G06F 16/215* (2019.01)
*G06F 16/2453* (2019.01)

(52) U.S. Cl.
CPC ...... *G06F 16/215* (2019.01); *G06F 16/24535* (2019.01); *G06F 16/24537* (2019.01); *G06F 16/24542* (2019.01)

(58) Field of Classification Search
CPC ............. G06F 16/215; G06F 16/24535; G06F 16/24537; G06F 16/24542
See application file for complete search history.

(56) References Cited

U.S. PATENT DOCUMENTS

| | | | |
|---|---|---|---|
| 7,739,263 B2 | 6/2010 | Das et al. | |
| 9,965,510 B2 | 5/2018 | Li et al. | |
| 10,592,506 B1 | 3/2020 | Thombre et al. | |
| 10,810,202 B2 | 10/2020 | Ding et al. | |
| 11,100,104 B2 | 8/2021 | Nanal et al. | |
| 2008/0091647 A1 | 4/2008 | Gao Zhong et al. | |
| 2008/0120283 A1* | 5/2008 | Liu | G06F 16/83 707/E17.127 |
| 2008/0133458 A1* | 6/2008 | Zabback | G06F 16/24545 715/764 |

(Continued)

FOREIGN PATENT DOCUMENTS

| | | |
|---|---|---|
| CN | 102222088 A | 10/2011 |
| CN | 112286912 A | 1/2021 |

(Continued)

OTHER PUBLICATIONS

Bruno, Nicolas, et al., "Power Hints for Query Optimization", 25th International Conference on Data Engineering [retrieved May 24, 2023]. Retrieved from the Internet <https://web.archive.org/web/20180723171018id_/https://www.microsoft.com/en-us/research/wp-content/uploads/2009/01/bruno-powerhints-research-long.pdf>., Apr. 2, 2009, 12 Pages.

(Continued)

*Primary Examiner* — Yuk Ting Choi
(74) *Attorney, Agent, or Firm* — FIG. 1 Patents

(57) ABSTRACT

A data quality check using a structured query language hint is described. A query optimizer of a database management system may receive a data quality check instruction as part of a database query statement for a database query. The query optimizer may modify a query execution plan for the database query based on the data quality check instruction so that completion of the database query is dependent on a result of a data quality check defined by the data quality (Continued)

check instruction. The database management system may execute the modified query execution plan.

17 Claims, 9 Drawing Sheets

(56) References Cited

U.S. PATENT DOCUMENTS

| | | | | |
|---|---|---|---|---|
| 2010/0250518 | A1* | 9/2010 | Bruno | G06F 16/24 707/718 |
| 2012/0191698 | A1* | 7/2012 | Albrecht | G06F 16/2453 707/718 |
| 2014/0089294 | A1* | 3/2014 | Shankar | G06F 16/24542 707/718 |
| 2021/0026855 | A1* | 1/2021 | Fender | G06F 16/24544 707/718 |
| 2023/0117461 | A1* | 4/2023 | Pasupuleti | G06F 16/2453 707/721 |
| 2025/0021554 | A1* | 1/2025 | Chang | G06F 16/24542 707/737 |

FOREIGN PATENT DOCUMENTS

| | | |
|---|---|---|
| CN | 112396343 A | 2/2021 |
| CN | 115495276 A | 12/2022 |
| CN | 115544072 A | 12/2022 |

OTHER PUBLICATIONS

Filho, Edson Ramiro Lucas, et al., "Don't Tune Twice: Reusing Tuning Setups for SQL-on-Hadoop Queries", International Conference on Conceptual Modeling [retrieved May 24, 2023]. Retrieved from the Internet <https://www.inf.ufpr.br/eduardo/papers/Ramiro_ER2019.pdf>., Nov. 4, 2019, 14 Pages.

Hemens, Lewis, "Advanced data quality testing with SQL and Dataform", Tada science, Inc., Blog [retrieved May 24, 2023]. Retrieved from the Internet <https://dataform.co/blog/advanced-data-quality-testing>., Mar. 10, 2020, 12 Pages.

* cited by examiner

DATA QUALITY CHECK USING A STRUCTURED QUERY LANGUAGE HINT

BACKGROUND

A database management system may include software and hardware components that enable the management, storage, retrieval, and manipulation of data in a database. The database management system may serve as an interface between users, applications, and the underlying database to allow for efficient and organized management of large amounts of data. For example, the database management system may enable the users to insert, update, retrieve, and delete data from the database using queries written in a domain-specific language, such as structured query language (SQL).

However, inaccurate, incomplete, or inconsistent data in the database may lead to erroneous analyses, misleading insights, and incorrect data-driven conclusions. Therefore, data quality checks—processes of evaluating a quality, accuracy, completeness, consistency, and/or validity of data stored in the database, such as within one or more target data tables—may be implemented. By performing data quality checks, database administrators can identify and rectify data issues, improve data integrity, and maintain a high level of data quality.

SUMMARY

A data quality check using a structured query language hint is described. A query optimizer of a database management system may receive a data quality check instruction as part of a database query statement for a database query. The query optimizer may modify a query execution plan for the database query based on the data quality check instruction so that completion of the database query is dependent on a result of a data quality check defined by the data quality check instruction. The database management system may execute the modified query execution plan.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
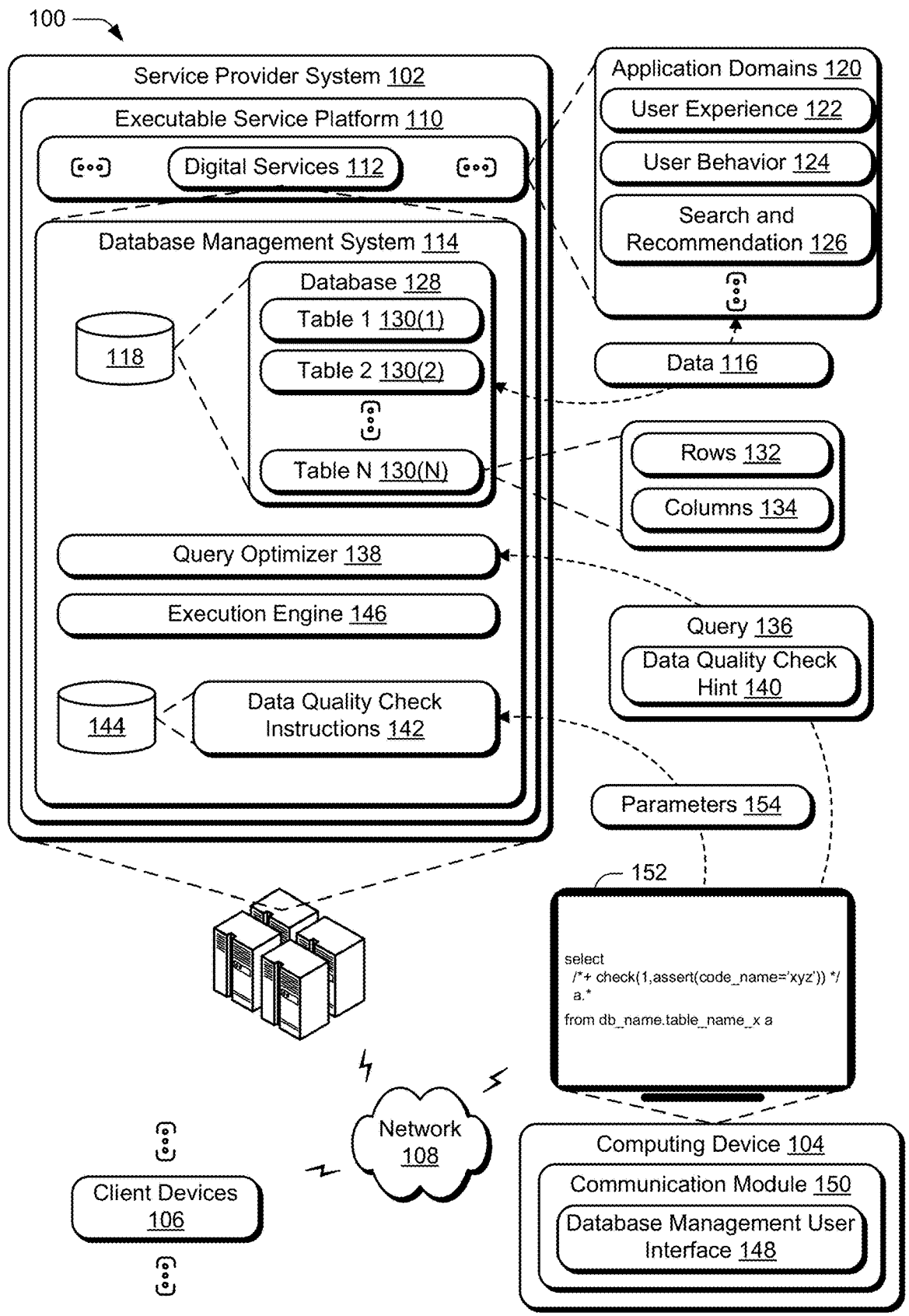
FIG. 1 is an illustration of a digital medium environment in an example implementation that is operable to employ data quality check techniques described herein.

Data quality impacts the reliability, usability, and effectiveness of data stored in a database. In general, "data quality" refers to an accuracy, completeness, consistency, timeliness, and relevance of the data. Data quality checks may be implemented in order to assess the data quality of one or more data tables of the database. Existing techniques for performing data quality checks of a database include using dedicated scripts (e.g., SQL statements) to perform the data quality check that are separate from other database queries. By way of example, the data quality check script may be integrated into the middle of an extract, transform, load (ETL) pipeline. As another example, the data quality check script may operate as part of an isolated pipeline. In both of these examples, the data quality check runs as an individual job in the pipeline.

However, using a dedicated data quality check script has a variety of issues. For instance, performing a data quality check as an individual job results in wasted resources by rescanning tables that are accessed via dependent jobs. For example, when the data quality check is integrated within the ETL pipeline, the data quality check may run after a dependent job completes. This increases processing times as well as computing resource usage. Although inputting the data quality check into the middle of the ETL pipeline can block the pipeline if the data quality check fails, it mixes the data quality check rules with ETL logic in a way that is complicated and disruptive of data processing flows. On the other hand, running the data quality check in an isolated pipeline does not block ETL jobs from completing in response to the data quality check failing, thus enabling inaccurate or unreliable results to be generated. Moreover, these script-based data quality checks are not reusable. As such, new scripts are generated for each data quality check, which further increases processing times and negatively impacts data processing efficiency.

Accordingly, a data quality check using a structured query language hint is described. This technique supports the use of reusable data quality check rules that are identified in a hint within a query, such as based on a keyword or other identification in the hint. In the context of query language, a hint is a comment or annotation that provides additional information to influence generation of a query execution plan by a query optimizer. In accordance with the techniques described herein, the query optimizer receives the query, which includes a data quality check hint, identifies the specific data quality check rules referenced in the hint, and constructs the query execution plan by loading configurable logic and parameters for the specified data quality check rules. As such, the data quality check and the query itself are executed together, via a single query execution plan. As a result of this single execution, processing times and computing resource usage are decreased compared to when the data quality check is executed as a stand-alone script that is separate from the query.

Moreover, the data quality check rules are configured to add a condition to the query execution plan that makes execution of the query dependent on a result of the data quality check. By way of example, the data quality check rules add a conditional clause to the query execution plan so that the query execution plan completes when the data quality check succeeds and fails when the data quality check fails. In this way, the techniques described herein block other data retrieval and/or manipulation operations specified in the query (e.g., that are not part of the data quality check) from being performed on inaccurate or unreliable data. As a result, data accuracy is efficiently maintained without disrupting data processing flows.

Because the data quality check rule is loaded by the query optimizer based on the keyword or other identification, the data quality check rule can be efficiently configured, e.g., via a database management user interface. For example, a database administrator may define or otherwise select, via the database management user interface, parameters that specify the logic and condition(s) of respective data quality check rules in order to differentiate high-quality data (e.g., data that pass the data quality check) from low-quality data (e.g., data that fail the data quality check). The database management user interface is configured to enable the database administrator to define new check rules, adjust the parameters of existing check rules, to activate or deactivate specific check rules, and so forth. The data quality check rules may be stored in a storage device that is accessible by the query optimizer so that the query optimizer retrieves a most recently updated version of a given data quality check rule while generating the query execution plan.

A plurality of different examples of data quality check rules are described herein that perform different types of data quality checks, including a record check instruction, a duplicate check instruction, a duplicate join instruction, a reference check instruction, and a scalar query instruction. The record check instruction includes a condition that a target record is present and not empty (e.g., null) in a target data table. As such, the data quality check succeeds in response to the target record being present in the target data table and fails in response to the target record being absent from the target data table. The duplicate check instruction includes a condition that the target data table has unique records, without duplicates. As such, the data quality check succeeds in response to no duplicate records being found in the target data table and fails in response to duplicate records being found in the target data table. The duplicate join instruction includes a condition that a projected join result of two target data tables has unique records, without duplicates. As such, the data quality check succeeds in response to no duplicate records being found in the projected join result and fails in response to duplicate records being found in the projected join result. The reference check instruction includes a condition that a reference from a first data table is present in a second data table. As such, the data quality check succeeds in response to the reference from the first data table being present in the second data table and fails in response to the reference from the first data table being absent from the second data table. The scalar query instruction includes a condition that a scalar generated via a pre-programmed subquery coverts to a "true" Boolean according to pre-defined conversion rules. As such, the data quality check succeeds in response to the scalar converting to a "true" Boolean (e.g., a first value of a binary) and fails in response to the scalar converting to a "false" Boolean (e.g., a second value of the binary) according to the pre-defined conversion rules. Further discussion of these and other examples is included in the following discussion and shown in corresponding figures.

In the following discussion, an example environment is first described that may employ the techniques described herein. Examples of implementation details and procedures are then described which may be performed in the exemplary environment as well as other environments. Performance of the example procedures is not limited to the example environment and the example environment is not limited to performance of the example procedures.

Example of an Environment

FIG. 1 is an illustration of a digital medium environment 100 in an example implementation that is operable to employ data quality check techniques described herein. The illustrated environment 100 includes a service provider system 102, a computing device 104, and a plurality of client devices 106 that are communicatively coupled, one to another, via a network 108. Computing devices that implement the service provider system 102, the computing device 104, and the client devices 106 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the service provider system 102 and as described with respect to FIG. 9.

The service provider system 102 includes an executable service platform 110. The executable service platform 110 is configured to implement and manage access to digital services 112 "in the cloud" that are accessible by the client devices 106 via the network 108. Thus, the executable service platform 110 provides an underlying infrastructure to manage execution of the digital services 112, e.g., through control of underlying computational resources.

The executable service platform 110 supports numerous computational and technical advantages, including an ability of the service provider system 102 to readily scale resources to address wants of an entity associated with the client devices 106. Thus, instead of incurring an expense of purchasing and maintaining proprietary computer equipment for performing specific computational tasks, cloud computing provides the client devices 106 with access to a wide range of hardware and software resources so long as the client has access to the network 108.

The digital services 112 can take a variety of forms. Examples of digital services include social media services, document management services, storage services, media streaming services, content creation services, productivity services, digital marketplace services, auction services, and so forth. In the present example, the digital services 112 include a database management system 114. In at least one implementation, the database management system 114 includes functionality for the creation, organization, management, and manipulation of at least one database in a manner that enables users and applications to store, retrieve, and manipulate data efficiently and accurately. The database management system 114 performs database management tasks, including the execution of data quality checks, according to steps of one or more algorithms and is thus configured as a special-purpose machine.

By way of example, execution of the digital services 112 by the executable service platform 110 generates data 116, which are illustrated as being stored in a storage device 118, e.g., a datastore of the database management system 114. The data 116 describes execution of the digital services 112 in this example as well as values of events that occur during this execution. The data 116 may be generated, for instance, by one or more application domains 120, non-limiting examples of which include a user experience domain 122, a user behavior domain 124, and a search and recommendation domain 126. The data 116 may also be retrieved from the storage device 118 for use by the one or more application domains 120, e.g., in response to a query.

In a search and recommendation example, for instance, the data 116 are used by the search and recommendation domain 126 to generate recommendations of items of digital content. The recommendations are configurable in a manner similar to performing a search based on a search query to locate the items of digital content. Use of the search result as a recommendation supports a variety of usage scenarios, including digital audio recommendations, digital video recommendations, auction items, and so forth.

In the digital medium environment 100 shown in FIG. 1, the storage device 118 is, or includes, a database 128. Although one database is shown, it is to be appreciated that the storage device 118 may include a plurality of databases. The database 128 is a structured collection of data that is organized to enable efficient storage and retrieval of the data 116. By way of example, the database 128 is organized as a plurality of data tables, shown in FIG. 1 as a first data table 130(1) (e.g., "table 1"), a second data table 130(2) (e.g., "table 2"), and an nth data table 130(N) (e.g., "table N"), with ellipses denoting that one or more other data tables may exist in the database 128. Each data table includes rows 132 (also referred to as "records") and columns 134 (also referred to as "fields"), shown with respect to a single data table in FIG. 1 for illustrative clarity, to further organize the data 116 stored therein. It is to be appreciated that although not specifically illustrated in FIG. 1, the database 128 may include other data structures, e.g., indexes, in addition to data tables.

Figure 2:
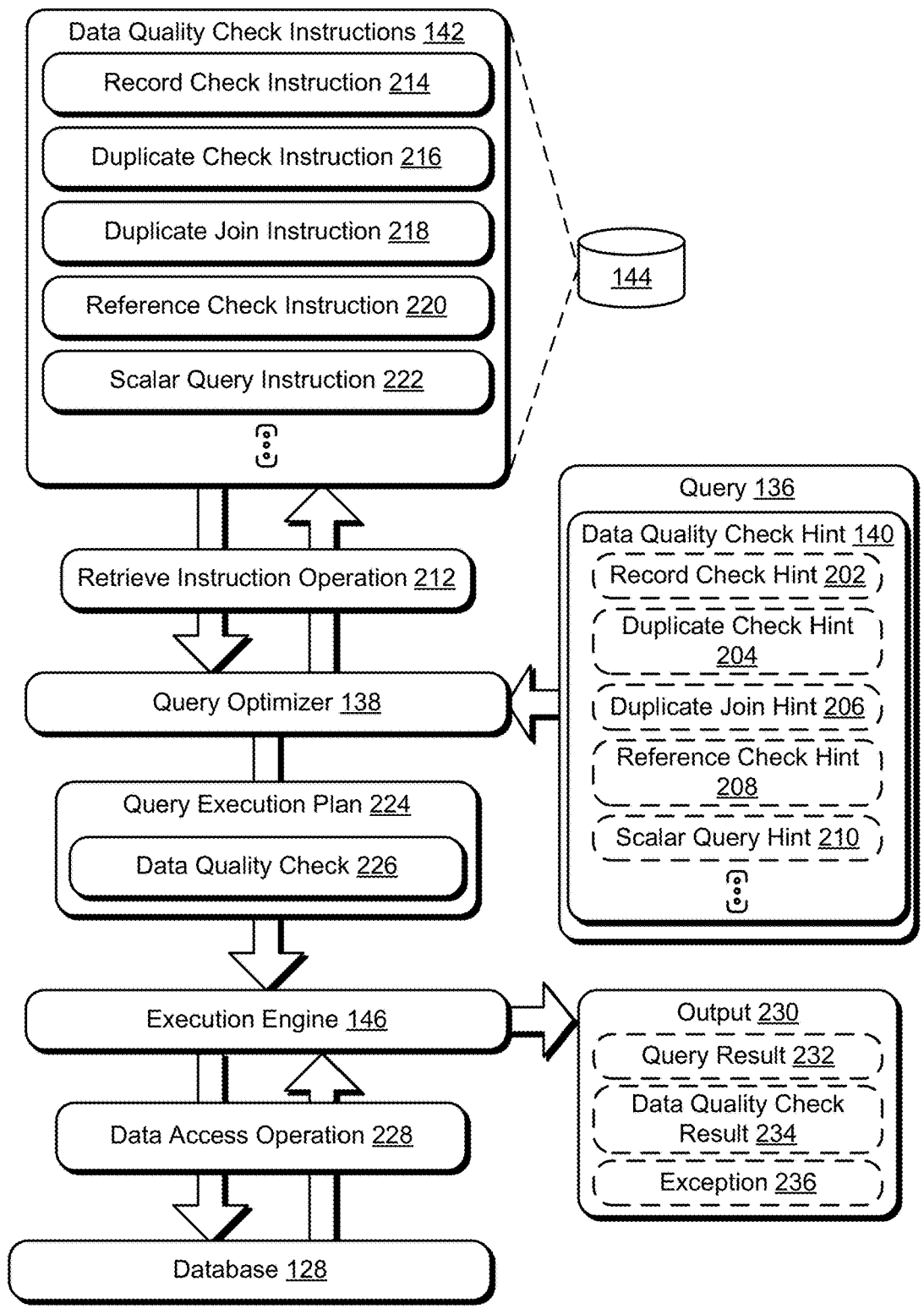
FIG. 2 depicts an example implementation showing operation of the query optimizer and the execution engine of the database management system of FIG. 1 in greater detail.

As will be elaborated herein, e.g., with respect to FIG. 2, the database management system 114 is configured to receive a query 136, which includes a request or command issued to retrieve or manipulate data stored in the database 128. By way of example, the query 136 is an expression written in a query language, such as structured query language (SQL), that specifies the criteria and conditions for the desired data. The query 136, for instance, may be used to extract information from the database 128, filter data based on specific conditions, perform calculations, and/or combine data from multiple data tables. In at least one implementation, the query 136 is submitted by a user, such as will be elaborated below. Additionally or alternatively, the query 136 is submitted by an application, such as via one of the application domains 120. As a non-limiting example, the query 136 may be submitted as part of an extract, transform, load (ETL) process used to extract the data 116 from various sources, transform it into a suitable format, and load it into the database 128. The ETL process may be user-initiated or automated via a schedule (e.g., at a pre-determined time interval or time of day) and/or in response to a pre-determined trigger event, e.g., a data arrival event and/or a data file modification event. It is to be appreciated that the query 136 may be generated by other events and processes without departing from the scope of the described techniques.

The query 136 is received by a query optimizer 138 of the database management system 114. The query optimizer 138 analyzes the query 136 and determines the most efficient way to fulfill the query 136, such as to retrieve or manipulate the data 116 specified in the query 136. This analysis produces a query execution plan, which outlines steps that the database management system 114 will take to execute the query 136 and, for example, retrieve the data 116 from the database 128. In at least one implementation, the query execution plan includes a series of steps (e.g., operators) that are executed in a specific order to retrieve the data 116. Each operator in the query execution plan corresponds to a specific task, such as filtering data or joining tables. The query optimizer 138 determines the order of these operators based on the estimated computational cost of each operator and available resources of the service provider system 102.

In the present example, the query 136 includes a data quality check hint 140. In at least one implementation, the data quality check hint 140 is a subquery of the query 136 that is added to the query 136 as a comment, e.g., a hint. Broadly, hints are additional instructions that can be added to the query 136 to provide guidance to the query optimizer 138 on how to execute the query 136. Thus, the data quality check hint 140 influences the query execution plan. The data quality check hint 140 includes instructions for injecting a data quality check into the query execution plan, as will be further described with respect to FIG. 2. The data quality check hint 140, for instance, may identify, or may be used by the query optimizer 138 to identify, a data quality check instruction (also referred to as a "check rule" herein) from among a plurality of data quality check instructions 142 stored in a storage device 144. Individual check rules of the plurality of data quality check instructions 142 may have different logic and/or variables with respect to each other. Although the storage device 144 is shown included in the database management system 114, it is to be appreciated that the storage device 144 may be remote from other components of the database management system 114, such as located in a server that is remote from the database 128.

In one or more implementations, the check rules of the plurality of data quality check instructions 142 include one or more conditions that, when satisfied, enable execution of the query 136 by an execution engine 146, and, when not satisfied, block execution of the query 136 by the execution engine 146. Each check rule of the plurality of data quality check instructions 142 may be a different type of data quality check that includes a different one or more conditions with respect to each other. In this way, the query 136 may not complete when the data quality check does not pass. In at least one implementation, success or failure of the query 136 itself is recorded in a data table, which may be included in the database 128 or in a different database. Specific examples of data quality check rules and conditions will be provided herein, for example, with respect to FIG. 2.

In accordance with the techniques described herein, in response to receiving the query 136 including the data quality check hint 140, the query optimizer 138 identifies (e.g., selects) and retrieves the appropriate check rule of the plurality of data quality check instructions 142 based on the check rule identified in the data quality check hint 140 (e.g., based on a keyword or name identification) and/or base on a context of the query 136. The logic of the identified check rule is inserted into the query 136 such that the query 136 is enhanced and/or rewritten to include the corresponding data quality check. In at least one implementation, the query optimizer 138 retrieves a previously generated query execution plan that is stored in memory and used for executions of the same query 136 (e.g., the same SQL statement), and so the query optimizer 138 modifies this previously generated query execution plan to include the data quality check specified by the data quality check hint 140. Additionally or alternatively, the query optimizer 138 newly generates at least parts of the query execution plan, including the data quality check specified by the data quality check hint 140.

Because the check rule executes along with the query 136, computational efficiency is increased compared to performing a data quality check as a separate query. For example, an overall runtime and resource consumption is decreased compared with running a data quality check separately from the query 136. Moreover, because the data quality check blocks completion of the query 136 by using the data quality check hint 140 according to the techniques described herein, the database 128 is maintained more accurately then when the data quality check is performed in a pipeline that is independent from the query 136.

Because the check rules of the plurality of data quality check instructions 142 are stored in the storage device 144 and loaded based on the data quality check hint 140, the check rules are reusable and configurable, enabling efficient management of the check rules and their usage. In at least one implementation, the database management system 114 is configured to generate a database management user interface 148, which is illustrated as accessed by the computing device 104 via the network 108 using a communication module 150, e.g., a browser, a network-enabled application, or the like. The database management user interface 148, as displayed by a display device 152, is configured to receive inputs to specify, for example, a variable, a status (e.g., enabled or disabled), a condition, and/or a threshold of individual check rules of the plurality of data quality check instructions 142, shown collectively as parameters 154 in FIG. 1. In one or more implementations, these parameters 154 are usable as part of database management to support automated generation of the check rule logic (e.g., as part of a SQL statement and/or the query execution plan) by the database management system 114, automatically and without user intervention.

As mentioned above, the parameters 154 may include variables, e.g., programmable variables. The variables are named placeholders that, once defined (e.g., by the user), enable the manipulation of values within a SQL statement and further enable the values to be passed between different parts of a SQL script, between different queries, and the like. By way of example, a variable may specify an initial value, a data type, and/or a data storage location of a target value. The variables, along with the other parameters 154, are loaded from the storage device 144 (e.g., by the database management system 114) automatically and without user intervention based on the data quality check hint 140 specified in the query 136.

The database management user interface 148 is further usable to receive user input that submits the query 136 to the database management system 114. For example, a user may generate (e.g., manually input) or otherwise select the particular clauses, keywords, and parameters included in the query 136, including the data quality check hint 140. The database management user interface 148, for instance, may include functionality to guide the user through the selection of various data retrieval and manipulation functions and automatically generate the query 136 in the relevant query language based on the user's selections. Alternatively, the user may manually compose the query 136 in the relevant query language without guidance, or with reduced guidance, from the database management user interface 148. Additionally or alternatively, the query 136 may be automatically generated by the one or more application domains 120, such as mentioned above.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

FIG. 2 depicts an example implementation 200 showing operation of the query optimizer 138 and the execution engine 146 of the database management system 114 of FIG. 1 in greater detail. The following discussion describes techniques that are implementable utilizing the previously described systems and devices.

The query optimizer 138 receives the query 136, which includes the data quality check hint 140. In the example implementation 200, the data quality check hint 140 is one of a record check hint 202, a duplicate check hint 204, a duplicate join hint 206, a reference check hint 208, and a scalar query hint 210. Ellipses denote that one or more other types of data quality hints may exist without departing from the scope of the described techniques. In response to receiving the query 136 and based on the data quality check hint 140 included in the query 136, the query optimizer 138 performs a retrieve instruction operation 212 to retrieve a corresponding data quality check instruction of the plurality of data quality check instructions 142 from the storage device 144. In the example shown in FIG. 2, the plurality of data quality check instructions 142 include a record check instruction 214, a duplicate check instruction 216, a duplicate join instruction 218, a reference check instruction 220, and a scalar query instruction 222. For example, the retrieve instruction operation 212 includes retrieving the record check instruction 214 in response to the data quality check hint 140 being the record check hint 202, retrieving the duplicate check instruction 216 in response to the data quality check hint 140 being the duplicate check hint 204, retrieving the duplicate join instruction 218 in response to the query 136 being the duplicate join hint 206, retrieving the reference check instruction 220 in response to the data quality check hint 140 being the reference check hint 208, or retrieving the scalar query instruction 222 in response to the data quality check hint 140 being the scalar query hint 210. Ellipses denote that one or more other check rules may exist in the plurality of data quality check instructions 142.

The different check rules of the plurality of data quality check instructions 142 include logic (e.g., instructions) for implementing a data quality check. By way of example, the record check instruction 214 includes logic for checking a target record of a target data table, where the target record and the target data table are specified (e.g., as programmable variables) in the record check instruction 214. As will be described in greater detail with respect to, e.g., FIG. 4, a record check data quality check operation specified by the record check instruction 214 is satisfied in response to the target record being present in the target data table and is not satisfied in response to the target record being absent from the target data table.

As another example, the duplicate check instruction 216 includes logic for checking whether duplicate records exist in a target data table specified in the duplicate check instruction 216. A duplicate check data quality check operation specified by the duplicate check instruction 216 is satisfied, for example, in response to an absence of duplicate records in the target data table and is not satisfied in response to duplicate records being present in the target data table, as will be elaborated with respect to FIG. 5.

The duplicate join instruction 218, for instance, includes logic for anticipating records duplication during a join operation of two target data tables. For example, as will be elaborated with respect to FIG. 6, a duplicate join data quality check operation specified by the duplicate join instruction 218 is satisfied in response to a join result of the two target data tables not including duplicate records, such as when the join result includes records that are unique with respect to each other. Conversely, the duplicate join instruction 218 is not satisfied in response to the join result of the two target data tables including duplicate records, such as when records in the join result are not unique with respect to each other.

As yet another example, the reference check instruction 220 includes logic for determining whether two target data tables specified in the reference check instruction 220 can be joined based on overlapping records. As will be described in greater detail below with respect to FIG. 7, a reference check data quality check operation is satisfied in response to a specified reference from a first target data table being present in a second target data table and is not satisfied in response to the specified reference being absent from the second target data table. By way of example, if the specified reference from the first target data table is a,b,c and the second target data table includes a,b (and not c), the reference check data quality check operation is not satisfied. In contrast, if the second target data table includes a,b,c or a,b,c,d, for instance, the reference check data quality check operation is satisfied.

The scalar query instruction 222 includes logic for implementing a programmable subquery that returns a single value, which may be transformed into a Boolean value that indicates "true" or "false," thus providing a binary output. The programmable subquery may be a complex instruction. As non-limiting examples, the programmable subquery may retrieve a maximum or a minimum value from a target data table specified in the scalar query instruction 222, check for the existence of specific data based on certain conditions (e.g., a value greater than zero or a non-zero threshold), retrieve a single value as an aggregate function applied to a column (e.g., a sum or average), or return a single value as another type of calculation. As will be elaborated with respect to FIG. 8, a scalar query data quality check specified by the scalar query instruction 222 is satisfied in response to the Boolean being "true" and is not satisfied in response to the Boolean being "false."

After fetching the appropriate data quality check instruction 142, the query optimizer 138 generates a query execution plan 224 based on the query 136 and the retrieved data quality check instruction specified in the data quality check hint 140. Accordingly, the query execution plan 224 includes a data quality check 226, such as the record check data quality check, the duplicate check data quality check, the duplicate join data quality check, the reference check data quality check, or the scalar query data quality check described above. In one or more implementations, the query execution plan 224 is a detailed strategy outlining the steps and operations the execution engine 146 will perform to retrieve and/or manipulate the data requested in the query 136 based on, for example, table sizes, available indexes, and/or other factors that affect execution time and resource usages in order to increase (e.g., maximize) efficiency and reduce (e.g., minimize) computing resource consumption.

In accordance with the described techniques, the query optimizer 138 generates the query execution plan 224 so that completion of the query execution plan 224, and thus the query 136 itself, is dependent on a result of the data quality check 226. As such, the query execution plan 224 is modified compared to when the query 136 does not include the data quality check hint 140. For example, the data quality check 226 includes one or more conditional clauses within the query execution plan 224 that blocks further execution of the query execution plan 224 in response to the one or more conditional clauses not being satisfied and enables execution of the remaining steps of the query execution plan 224 in response to the one or more conditional clauses being satisfied.

The execution engine 146 receives the query execution plan 224 from the query optimizer 138 and performs the operations specified in the query execution plan 224 directly and/or by managing computing resources of the database management system 114 during execution. By way of example, the execution engine 146 employs access methods to scan tables and/or use indexes of the database 128 in order to access and/or manipulate the data stored therein, depicted as a data access operation 228 in FIG. 2.

The execution engine 146 generates an output 230, which may include one or more of a query result 232, a data quality check result 234, and an exception 236. By way of example, the output 230 includes both of the query result 232 and the data quality check result 234 when the data quality check 226 is satisfied (e.g., succeeds) or includes the data quality check result 234 and the exception 236, and not the query result 232, when the data quality check 226 is not satisfied (e.g., fails) due to the dependence on the data quality check result 234 for query execution. The query result 232 may include data specified in the query 136, results of the data manipulation operations specified in the query 136, and/or a report of the operations performed by the execution engine 146. The data quality check result 234 may indicate whether the data quality check 226 succeeded or failed. The exception 236 may include instructions for specific actions to be performed, e.g., by the database management system 114, in response to the data quality check 226 failing. The actions may include, for example, logging the failure, rolling back an operation, and/or communicating reasons for the failure to an administrator of the database 128.

In this way, the data quality check hint 140 is usable by the query optimizer 138 to inject a reusable and configurable data quality check 226 into the query execution plan 224 so that the query result 232 is not output by the execution engine 146 when the data quality check 226, as defined by an associated check rule of the plurality of data quality check instructions 142, fails. As a result, high data integrity can be maintained in the database 128 with reduced job execution times and computing resource usage.

Example Procedures

This section describes examples of procedures for a data quality check using a structured query language hint. Aspects of the procedures may be implemented in hardware, firmware, software, or a combination thereof. The procedures are shown as a set of blocks that specify operations performed by one or more devices and are not necessarily limited to the orders shown for performing the operations by the respective blocks.

Figure 3:
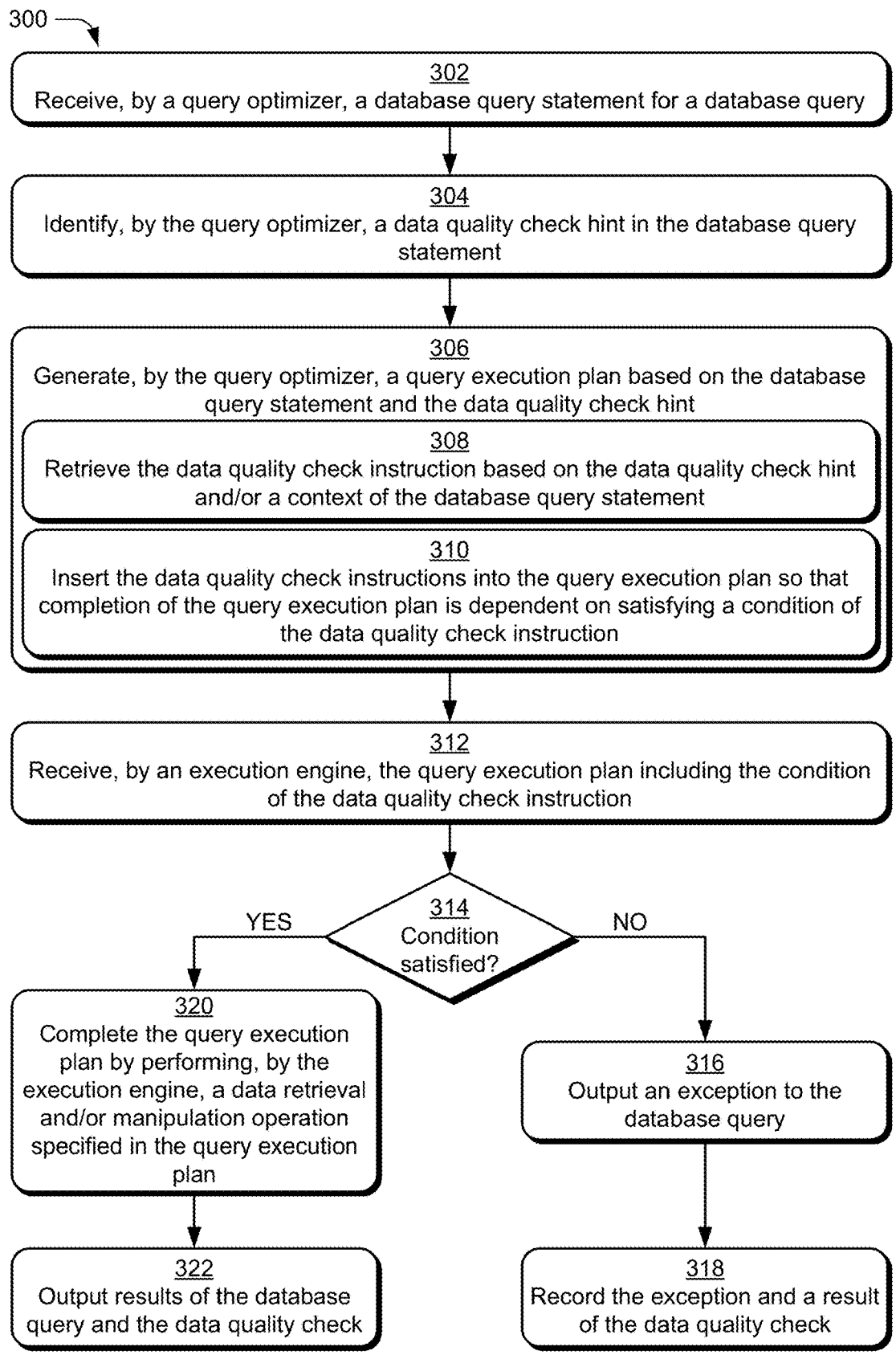
FIG. 3 is a flow diagram depicting an algorithm as a step-by-step procedure in an example of implementing a data quality check using a query hint.

FIG. 3 is a flow diagram depicting an algorithm as a step-by-step procedure 300 in an example of implementing a data quality check using a query hint. In at least one implementation, the procedure 300 is performable by a database management system (e.g., the database management system 114), including the query optimizer 138 and the execution engine 146. While the procedure 300 is a high-level method for executing the data quality check that is applicable to a plurality of different types of data quality checks, additional procedures for executing specific types of data quality checks are also described herein, e.g., with respect to FIGS. 4-8.

A database query statement for a database query is received by a query optimizer (block 302). By way of example, the database query statement may be provided to the database management system 114 by a user (e.g., via the database management user interface 148) or scheduled by, for example, the one or more application domains 120. The database query statement may specify desired data retrieval and/or manipulation operations to be performed during the database query, such as data movement and integration operations of ETL processes, and may be communicated in a programming language (e.g., structured query language) that is understood by the query optimizer 138. The database query statement may include one or more clauses that define at least one operation to be performed on data within the database 128. Non-limiting examples of such operations include data retrieval, data updates, data filtering, data sorting, data table joining, data aggregation, data movement, and other data-based calculations.

A data quality check hint is identified in the database query statement by the query optimizer (block 304). By way of example, the query optimizer 138 analyzes the database query statement and identities the presence of the data quality check hint 140 based on hint-specific syntax within the database query statement and a keyword indicating a name of the particular data quality check hint. That is, the query optimizer 138 recognizes the specific keyword (e.g., hint name) and/or other annotation indicating the data quality check hint 140. As mentioned above with respect to FIG. 2, examples of specific data quality check hints include the record check hint 202, the duplicate check hint 204, the duplicate join hint 206, the reference check hint 208, and the scalar query hint 210, although other data quality check hints are also possible.

A query execution plan is generated, by the query optimizer, based on the database query statement and the data quality check hint (block 306). By way of example, the query optimizer 138 analyzes the database query statement and generates the query execution plan 224 based on table sizes, available indexes, execution time, and resource usage.

The query execution plan 224 includes a series of operators (e.g., steps) that are to be executed in a specific order to perform the data retrieval and/or manipulation operations specified in the query database statement. Each operator in the query execution plan 224 is related to executing a specific task, such as filtering data or joining tables. The query optimizer 138 determines the order of these operators based on an estimated computational cost and execution time and the available resources of the database 128, for example.

In accordance with the described techniques, generating the query execution plan includes retrieving a data quality check instruction based on the data quality check hint and/or a context of the database query statement (block 308). By way of example, the query optimizer 138 retrieves the data quality check instruction from the storage device 144 based on the keyword indicated in the data quality check hint 140. The storage device 144, for instance, may store plurality of data quality check instructions 142 in a manner that enables efficient updates to the parameters 154, e.g., via the database management user interface 148. The data quality check instruction includes one or more predefined rules, constraints, and/or criteria, collectively referred to as a "condition," that differentiates reliable data from unreliable data.

Generating the query execution plan further includes inserting the data quality check instruction into the query execution plan so that completion of the query execution plan is dependent on satisfying a condition of the data quality check instruction (block 310). As mentioned above, the operators are executed in order, and so the query optimizer 138 builds the query execution plan 224 such that the data retrieval and/or manipulation operations cannot be completed unless the condition of the data quality check instruction is satisfied. As such, the query optimizer 138 modifies the query execution plan 224 compared to when the data quality check hint 140 is not included in the query 136. The condition is specified by the data quality check being performed and evaluates whether a quality, accuracy, completeness, consistency, and/or validity of data stored in the database, such as within one or more target data tables specified in the database query statement, are as expected.

The query execution plan, including the condition of the data quality check instruction, is received by an execution engine (block 312). By way of example, the execution engine 146 interprets the query execution plan 224 and carries out the operators in the order specified, such as by accessing tables and/or indexes of the database 128 to complete the data quality check 226 before completing other data retrieval and/or manipulation operations specified in the database query statement. Specific, non-limiting examples of the conditions and operations performed by the execution engine 146 while completing the data quality check 226 are described herein, e.g., with respect to FIGS. 2 and 4-8.

It is determined if the condition is satisfied (block 314). By way of example, the condition is satisfied if the data quality check passes, thus indicating that the data quality, accuracy, completeness, consistency, and/or validity is as expected according to the logic and the parameters 154 of the particular data quality check 226 being used. Conversely, the condition is not satisfied if the data quality check fails due to the data quality, accuracy, completeness, consistency, and/or validity not being as expected according to the logic and the parameters 154 specified by the particular data quality check 226 being used.

If the condition is not satisfied, an exception to the database query is output (block 316). By way of example, the exception 236 includes instructions for specific actions to be performed, e.g., by the database management system 114, in response to the data quality check failing. The actions may include, for example, logging the failure, rolling back an operation, and/or communicating the failure to an administrator of the database 128. Outputting the exception 236 further causes the remaining steps in the query execution plan 224 not to be executed due to the data quality check indicating that the data stored in the database 128 is inaccurate, incomplete, inconsistent, and/or invalid. Thus, the data manipulation and/or retrieval operations specified in the database query statement are blocked from being performed.

The exception and a result of the data quality check are recorded (block 318). By way of example, the execution engine 146, or another component of the database management system 114, logs the exception and the result of the data quality check in a data table, such as in one of the tables of the database 128 or in another database. An entry may be added to the data table that includes, for instance, a job identifier, a time stamp (e.g., a date and time), information regarding the database query statement that was attempted, information regarding which data quality check was performed (e.g., the keyword or hint name), an indication that the data quality check failed, and the exception that was output.

On the other hand, if the condition is satisfied, the query execution plan is completed by the execution engine performing a data retrieval and/or manipulation operation specified in the query execution plan (block 320). By way of example, the execution engine 146 may execute the remaining steps in the query execution plan 224 due to the data quality check indicating that the data stored in the data access operation 228 is accurate, complete, consistent, and/or valid, and the database query succeeds.

Results of the database query and the data quality check are output (block 322). By way of example, the results of the database query include a final output of the query execution, such as the selected data, results of the data manipulation operations, and/or a report of the operations performed by the execution engine 146. Moreover, as described above with respect to block 318, an entry may be added to the data table that records the results of the data quality check, including, for example, the job identifier, the time stamp, information regarding the database query statement, information regarding the data quality check that was performed, and an indication that the data quality check succeeded.

Figure 4:
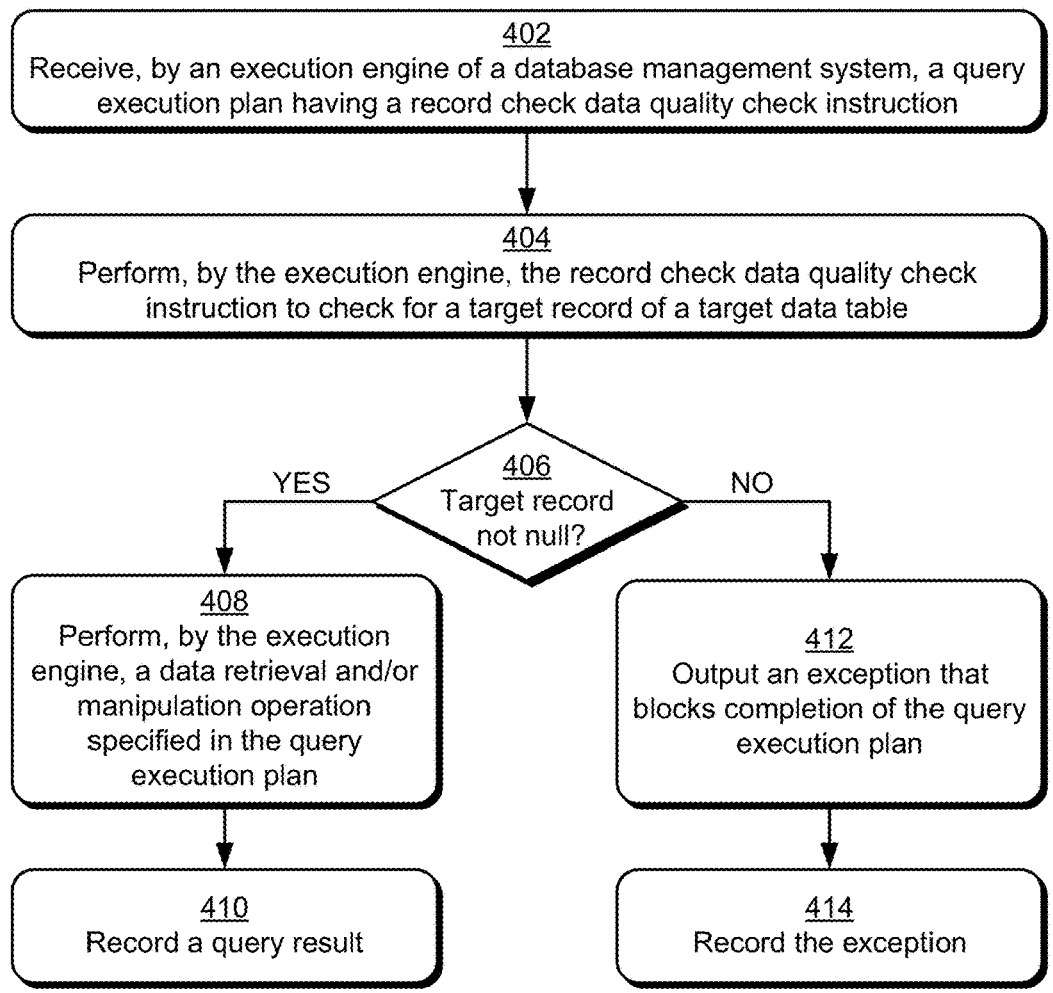
FIG. 4 is a flow diagram depicting an algorithm as a step-by-step procedure in an example of implementing a data quality check for a single record in a single table of a database while executing a database query.

FIG. 4 is a flow diagram depicting an algorithm as a step-by-step procedure 400 in an example of implementing a data quality check for a single record in a single table of a database while executing a database query. In at least one implementation, the procedure 400 is performable by a database management system (e.g., the database management system 114), including the query optimizer 138 and the execution engine 146. Moreover, the procedure 400 may performed as a part of the procedure 300 of FIG. 3, e.g., at block 312. Alternatively, the procedure 400 may be performed independently from the procedure 300. It is to be appreciated that the database management system 114 may implement a data quality check that includes identifying whether the single record is present in the single table of the database by executing operations that differ from those described below without departing from the scope of the present disclosure.

A query execution plan having a record check data quality check instruction is received by an execution engine of a database management system (block 402). By way of example, the execution engine 146 receives the query execution plan 224 having the data quality check 226 from the query optimizer 138, such as described above with respect to FIGS. 2 and 3. In the example procedure 400, the data quality check 226 corresponds to the record check instruction 214. Continuing with the present example, the record check instruction 214 includes logic for checking for a target record of a target data table, and so the query execution plan 224 includes one or more operators for executing the check. For instance, the target data table may be identified via an operator that specifies a table name (e.g., the first data table 130(1)), and the target record may be identified via an operator that specifies a record identification name.

The record check data quality check instruction is performed by the execution engine to check for the target record of the target data table (block 404). By way of example, the record check data quality check instruction may include a check projection that is configured as a constraint in the query execution plan 224. As such, execution of the check projection may either block completion of the remaining operators of the query execution plan 224 if the target record is absent in the target data table or enable completion of the remaining operators of the query execution plan 224 if the target record is present in the target data table, as will be elaborated below. Execution of the check projection, for instance, may include scanning, by the execution engine 146, the target data table (or a specified column in the target data table) row-by-row for the target record.

It is determined if the target record is not null (block 406). By way of example, the target record is null if the target record is missing or otherwise has no value. In contrast, the target record is not null if the target record includes a value. As such, in the present example, the constraint (e.g., condition) of the data quality check 226 includes the target record not being null.

If the target record is not null, a data retrieval and/or manipulation operation specified in the query execution plan is performed by the execution engine (block 408). By way of example, because the constraint is "true" (e.g., the target record is not null), the condition of the data quality check 226 is satisfied, and the remaining operator(s) of the query execution plan 224 are executed by the execution engine 146, such as described above with respect to block 320 of FIG. 3.

A query result is recorded (block 410). By way of example, the query result 232, such as the selected data, results of the data manipulation operations, and/or a report of the operations performed by the execution engine 146, are stored in memory so that the query result 232 may be accessed by a user and/or the one or more application domains 120 that submitted the query 136.

Conversely, if the record is null, an exception is output that blocks completion of the query execution plan (block 412). By way of example, because the constraint is "false" (e.g., the target record is null), the condition of the data quality check 226 is not satisfied, and the remaining operator(s) of the query execution plan 224 are not executed by the execution engine 146. Instead, the exception 236 may provide instructions for recording the failure of the query 136 and/or remediating the data quality issue.

The exception is recorded (block 414). By way of example, the exception 236 is recorded in a data table of the database 128 or in another database. Moreover, the data table may be output via the database management user interface 148 and displayed via the display device 152 so that an administrator of the database management system 114 is alerted to the exception 236.

Figure 5:
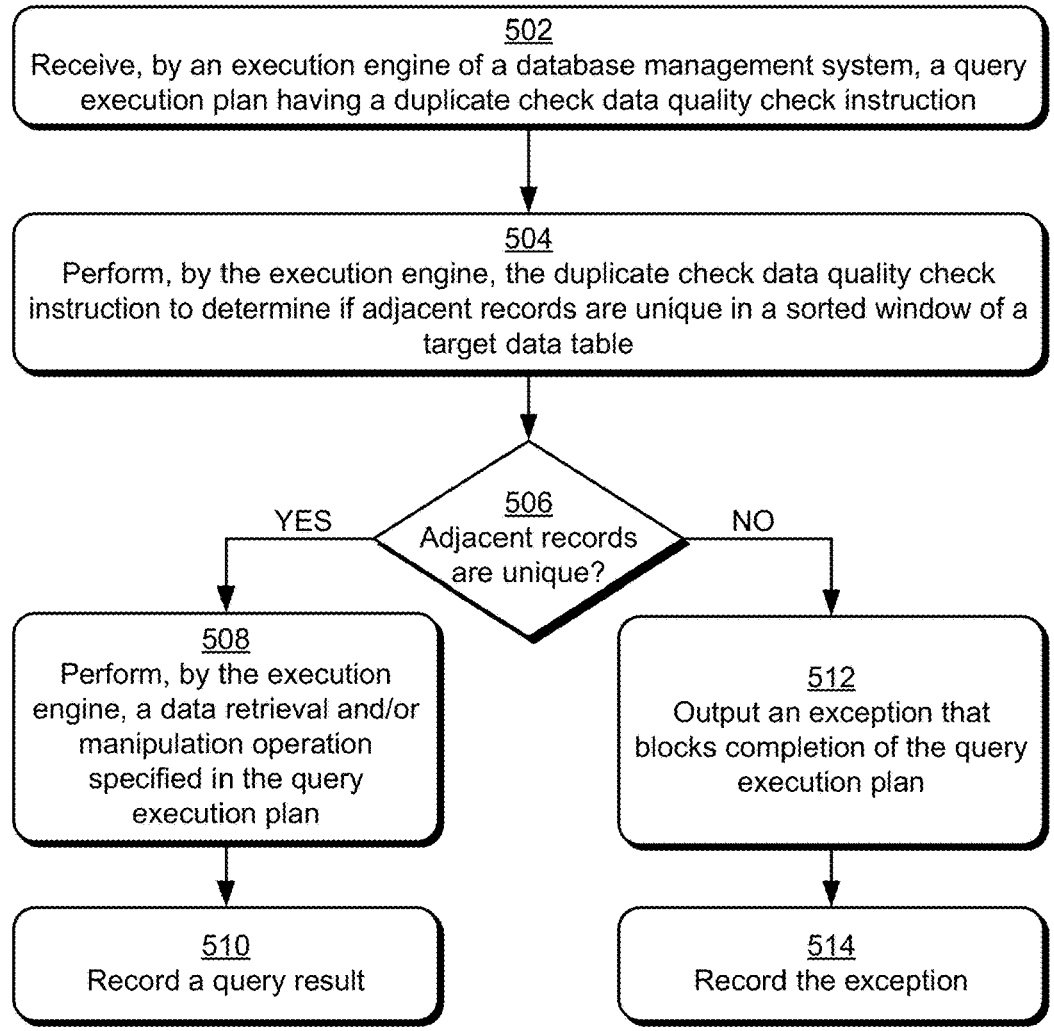
FIG. 5 is a flow diagram depicting an algorithm as a step-by-step procedure in an example of implementing a duplicate check of a table of a database while executing a database query.

FIG. 5 is a flow diagram depicting an algorithm as a step-by-step procedure 500 in an example of implementing a duplicate check in a table of a database while executing a database query. In at least one implementation, the procedure 500 is performable by a database management system (e.g., the database management system 114), including the query optimizer 138 and the execution engine 146. Moreover, the procedure 500 may performed as a part of the procedure 300 of FIG. 3, e.g., at block 312. Alternatively, the procedure 500 may be performed independently from the procedure 300. It is to be appreciated that the database management system 114 may implement a data quality check that includes identifying whether there are duplicate records in the table of the database by executing operations that differ from those described below without departing from the scope of the present disclosure.

A query execution plan having a duplicate check data quality check instruction is received by an execution engine of a database management system (block 502). By way of example, the execution engine 146 receives the query execution plan 224 having the data quality check 226 from the query optimizer 138, such as described above with respect to FIGS. 2 and 3. In the example procedure 500, the data quality check 226 corresponds to the duplicate check instruction 216. Continuing with the present example, the duplicate check instruction 216 includes logic for sorting records in a target data table and identifying whether duplicate records are present. For instance, the target data table may be identified via an operator that specifies a table name, e.g., the first data table 130(1) or another table of the database 128.

The duplicate check data quality check instruction is performed by the execution engine to determine if adjacent records are unique in a sorted window of the target data table (block 504). By way of example, the duplicate check data quality check instruction may include a window expression and a unique identification constraint. The window expression, when executed, may cause the data in the target data table to be sorted by identification name without altering the data in the data table. Execution of the unique identification constraint (e.g., by the execution engine 146) may block completion of the remaining operator(s) of the query execution plan 224 if duplicate records are found or enable completion of the remaining operator(s) of the query execution plan 224 if duplicate records are not found, as will be elaborated below.

It is determined if the adjacent records are unique (block 506). By way of example, the adjacent records are unique if no record has a same identification name as another record in the target data table. In contrast, the adjacent records are not unique if a first record has the same identification name as a second record in the target data table. As such, in the present example, the constraint (e.g., condition) of the data quality check 226 includes the adjacent records being unique.

If the adjacent records are unique, a data retrieval and/or manipulation operation specified in the query execution plan is performed by the execution engine (block 508). By way of example, because the constraint is "true" (e.g., the adjacent records are unique), the condition of the data quality check 226 is satisfied, and the remaining operator(s) of the query execution plan 224 are executed by the execution engine 146, such as described above with respect to block 320 of FIG. 3.

A query result is recorded (block 510). By way of example, the query result 232, such as the selected data, results of the data manipulation operations, and/or a report of the operations performed by the execution engine 146, are stored in memory so that the query result 232 may be accessed by a user and/or the one or more application domains 120 that submitted the query 136.

Conversely, if the adjacent records are not unique, an exception is output that blocks completion of the query execution plan (block 512). By way of example, because the constraint is "false" (e.g., the adjacent records are not unique), the condition of the data quality check 226 is not satisfied, and the remaining operator(s) of the query execution plan 224 are not executed by the execution engine 146. Instead, the exception 236 may provide instructions for recording the failure of the query 136 and/or remediating the data quality issue.

The exception is recorded (block 514). By way of example, the exception 236 is recorded in a data table of the database 128 or in another database. Moreover, the data table may be output via the database management user interface 148 and displayed via the display device 152 so that an administrator of the database management system 114 is alerted to the exception 236.

Figure 6:
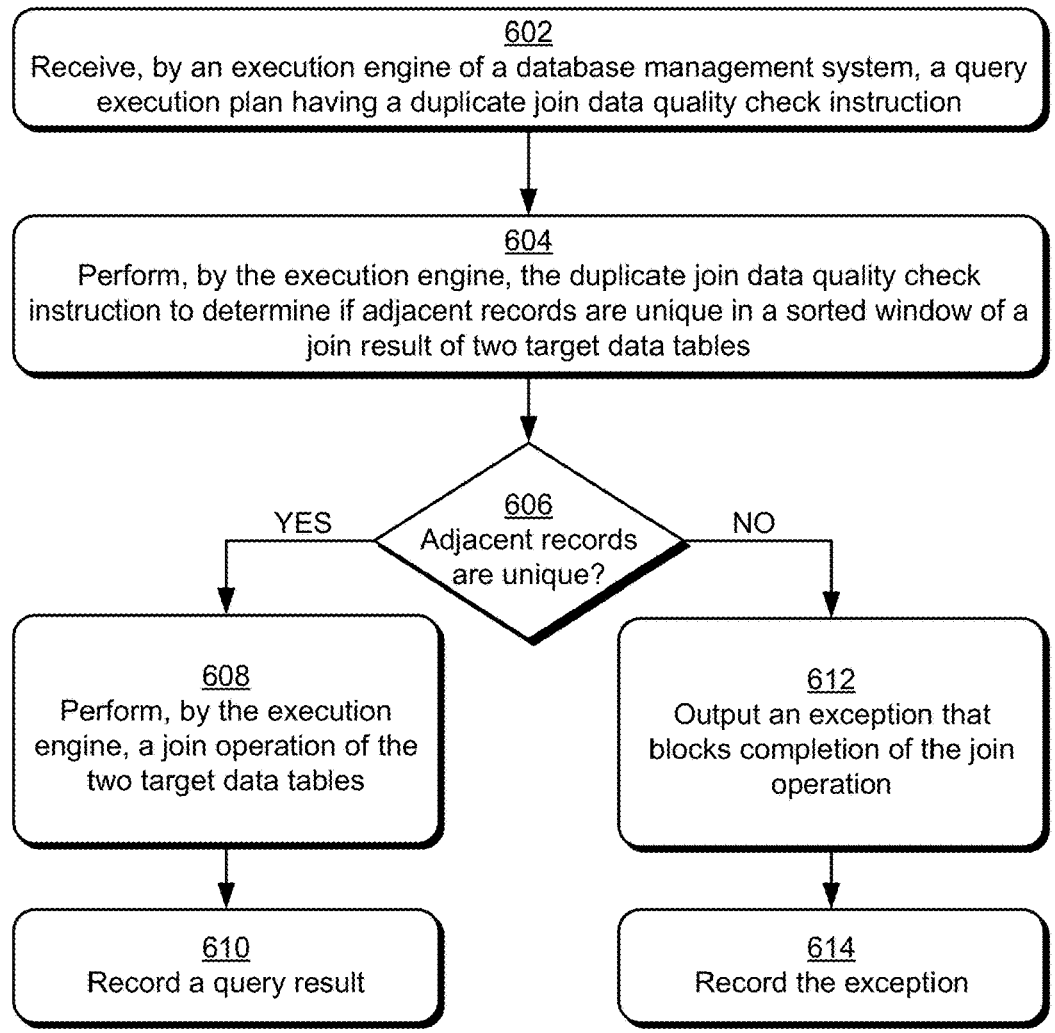
FIG. 6 is a flow diagram depicting an algorithm as a step-by-step procedure in an example of implementing a data quality check for records duplication while executing a join operation of a database query.

FIG. 6 is a flow diagram depicting an algorithm as a step-by-step procedure 600 in an example of implementing a data quality check for records duplication while executing a join operation of a database query. In at least one implementation, the procedure 600 is performable by a database management system (e.g., the database management system 114), including the query optimizer 138 and the execution engine 146. Moreover, the procedure 600 may performed as a part of the procedure 300 of FIG. 3, e.g., at block 312. Alternatively, the procedure 600 may be performed independently from the procedure 300. It is to be appreciated that the database management system 114 may implement a data quality check that includes identifying whether a join operation will duplicate records in the database by executing operations that differ from those described below without departing from the scope of the present disclosure.

A query execution plan having a duplicate join data quality check instruction is received by an execution engine of a database management system (block 602). By way of example, the execution engine 146 receives the query execution plan 224 having the data quality check 226 from the query optimizer 138, such as described above with respect to FIGS. 2 and 3. In the example procedure 600, the data quality check 226 corresponds to the duplicate join instruction 218. Continuing with the present example, the duplicate join instruction 218 includes logic for sorting records in a projection of a join result of two target data tables and identifying whether duplicate records are present. For instance, the two target data tables may be identified via at least one operator that specifies the table names, e.g., the first data table 130(1) and the second data table 130(2).

The duplicate join data quality check instruction is performed by the execution engine to determine if adjacent records are unique in a sorted window of a join result of two target data tables (block 604). By way of example, the duplicate join data quality check instruction may include a join clause (e.g., a left join, a right join, or a full join), a window expression, and a unique identification constraint. The join clause, when executed, may cause records from a first data table of the two target data tables (e.g., the first data table 130(1)) to be joined with records from a second data table of the two target data tables (e.g., the second data table 130(2)) to create a new data table, or the join result. The window expression, when executed, may cause data in the join result to be sorted by identification name without altering the data in the join result. Execution of the unique identification constraint (e.g., by the execution engine 146) may block completion of the remaining operator(s) of the query execution plan 224 if duplicate records are found or enable completion of the remaining operator(s) of the query execution plan 224 if duplicate records are not found, as will be elaborated below.

It is determined if the adjacent records are unique (block 606). By way of example, the adjacent records are unique if no record has a same identification name as another record in the join result. In contrast, the adjacent records are not unique if a first record has the same identification name as a second record in the join result. As such, in the present example, the constraint (e.g., condition) of the data quality check 226 includes the adjacent records in the sorted version of the join result being unique.

If the adjacent records are unique, a join operation of the two target data tables is performed by the execution engine (block 608). By way of example, because the constraint is "true" (e.g., the adjacent records are unique), the condition of the data quality check 226 is satisfied, and the remaining operator(s) of the query execution plan 224 are executed by the execution engine 146, such as described above with respect to block 320 of FIG. 3. In the present example, this includes joining the two target data tables according to the specified join clause.

A query result is recorded (block 610). By way of example, the query result 232, e.g., the join result, is stored in memory so that the query result 232 may be accessed by a user and/or the one or more application domains 120 that submitted the query 136. Moreover, the join result may be stored as a new data table in the database 128.

Conversely, if the adjacent records are not unique, an exception is output that blocks completion of the join operation (block 612). By way of example, because the constraint is "false" (e.g., the adjacent records are not unique), the condition of the data quality check 226 is not satisfied, and the remaining operator(s) of the query execution plan 224, including recording the join result, are not executed by the execution engine 146. Instead, the exception 236 may provide instructions for recording the failure of the query 136 and/or remediating the data quality issue.

The exception is recorded (block 614). By way of example, the exception 236 is recorded in a data table of the database 128 or in another database. Moreover, the data table may be output via the database management user interface 148 and displayed via the display device 152 so that an administrator of the database management system 114 is alerted to the exception 236.

Figure 7:
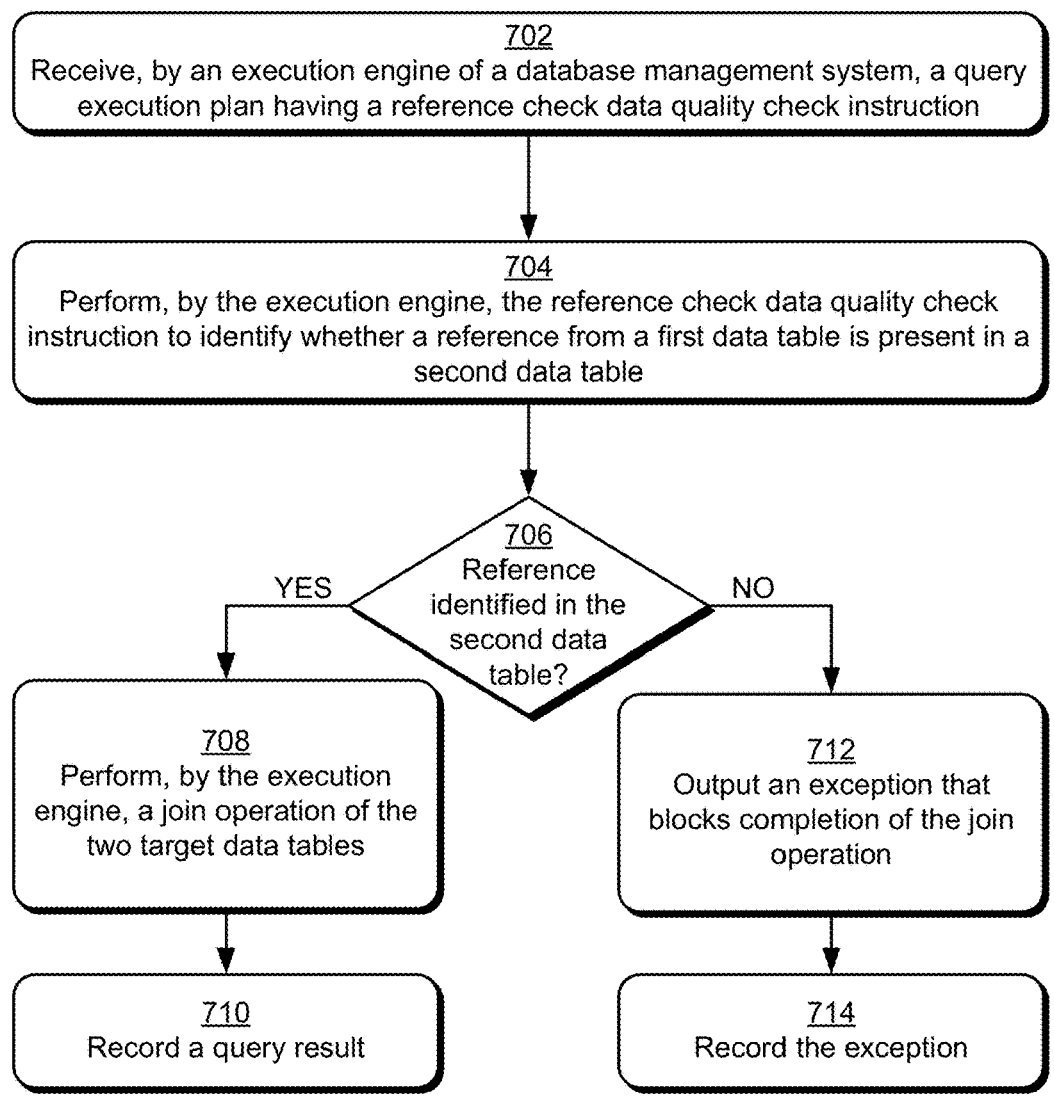
FIG. 7 is a flow diagram depicting an algorithm as a step-by-step procedure in an example of implementing a data quality check for an overlapping record between two target data tables while executing a database query.

FIG. 7 is a flow diagram depicting an algorithm as a step-by-step procedure 700 in an example of implementing a data quality check for a shared record between two target data tables while executing a database query. In at least one implementation, the procedure 700 is performable by a database management system (e.g., the database management system 114), including the query optimizer 138 and the execution engine 146. Moreover, the procedure 700 may performed as a part of the procedure 300 of FIG. 3, e.g., at block 312. Alternatively, the procedure 700 may be performed independently from the procedure 300. It is to be appreciated that the database management system 114 may implement a data quality check that includes checking data between two target data tables by executing operations that differ from those described below without departing from the scope of the present disclosure.

A query execution plan having a reference check data quality check instruction is received by an execution engine of a database management system (block 702). By way of example, the execution engine 146 receives the query execution plan 224 having the data quality check 226 from the query optimizer 138, such as described above with respect to FIGS. 2 and 3. In the example procedure 700, the data quality check 226 corresponds to the reference check instruction 220. Continuing with the present example, the reference check instruction 220 includes logic for a check projection that performs a reference check between two target data tables. For instance, the two target data tables may be identified via at least one operator that specifies the table names, e.g., the first data table 130(1) and the second data table 130(2).

The reference check data quality check instruction is performed by the execution engine to identify whether a reference from a first data table is present in a second data table (block 704). By way of example, the reference check data quality check instruction may include a join clause (e.g., a left join, a right join, or a full join) and a check projection. The join clause, when executed, may cause records from the first data table (e.g., the first data table 130(1)) to be joined with records from the second data table (e.g., the second data table 130(2)) to create a new data table, or a join result. Execution of the check projection, for instance, may include scanning, by the execution engine 146, the second data table (or a specified column in the second data table) row-by-row for a specified reference from the first data table, which may be indicated by an identification name. The check projection may be configured as a constraint in the query execution plan 224. As such, execution of the check projection may either block completion of the remaining operators of the query execution plan 224 if the reference is not found in the second data table or enable completion of the remaining operators of the query execution plan 224 if the reference is found in the second data table, as will be elaborated below.

It is determined if the reference is identified in the second data table (block 706). By way of example, the target record is identified in the second data table if the reference is present in the second data table. In contrast, the target record is not identified in the second data table if the reference is missing from the second data table. As such, in the present example, the constraint (e.g., condition) of the data quality check 226 includes the reference from the first data table being present in the second data table.

If the reference is identified in the second data table, a join operation of the two target data tables is performed by the execution engine (block 708). By way of example, because the constraint is "true" (e.g., the reference is found in the second data table), the condition of the data quality check 226 is satisfied, and the remaining operator(s) of the query execution plan 224 are executed by the execution engine 146, such as described above with respect to block 320 of FIG. 3. In the present example, this includes joining the two target data tables according to the specified join clause.

A query result is recorded (block 710). By way of example, the query result 232, e.g., the join result, is stored in memory so that the query result 232 may be accessed by a user and/or the one or more application domains 120 that submitted the query 136. Moreover, the join result may be stored as a new data table in the database 128.

Conversely, if the reference is not identified in the second data table, an exception is output that blocks completion of the join operation (block 712). By way of example, because the constraint is "false" (e.g., the reference is not found in the second data table), the condition of the data quality check 226 is not satisfied, and the remaining operator(s) of the query execution plan 224, including recording the join result, are not executed by the execution engine 146. Instead, the exception 236 may provide instructions for recording the failure of the query 136 and/or remediating the data quality issue.

The exception is recorded (block 714). By way of example, the exception 236 is recorded in a data table of the database 128 or in another database. Moreover, the data table may be output via the database management user interface 148 and displayed via the display device 152 so that an administrator of the database management system 114 is alerted to the exception 236.

Figure 8:
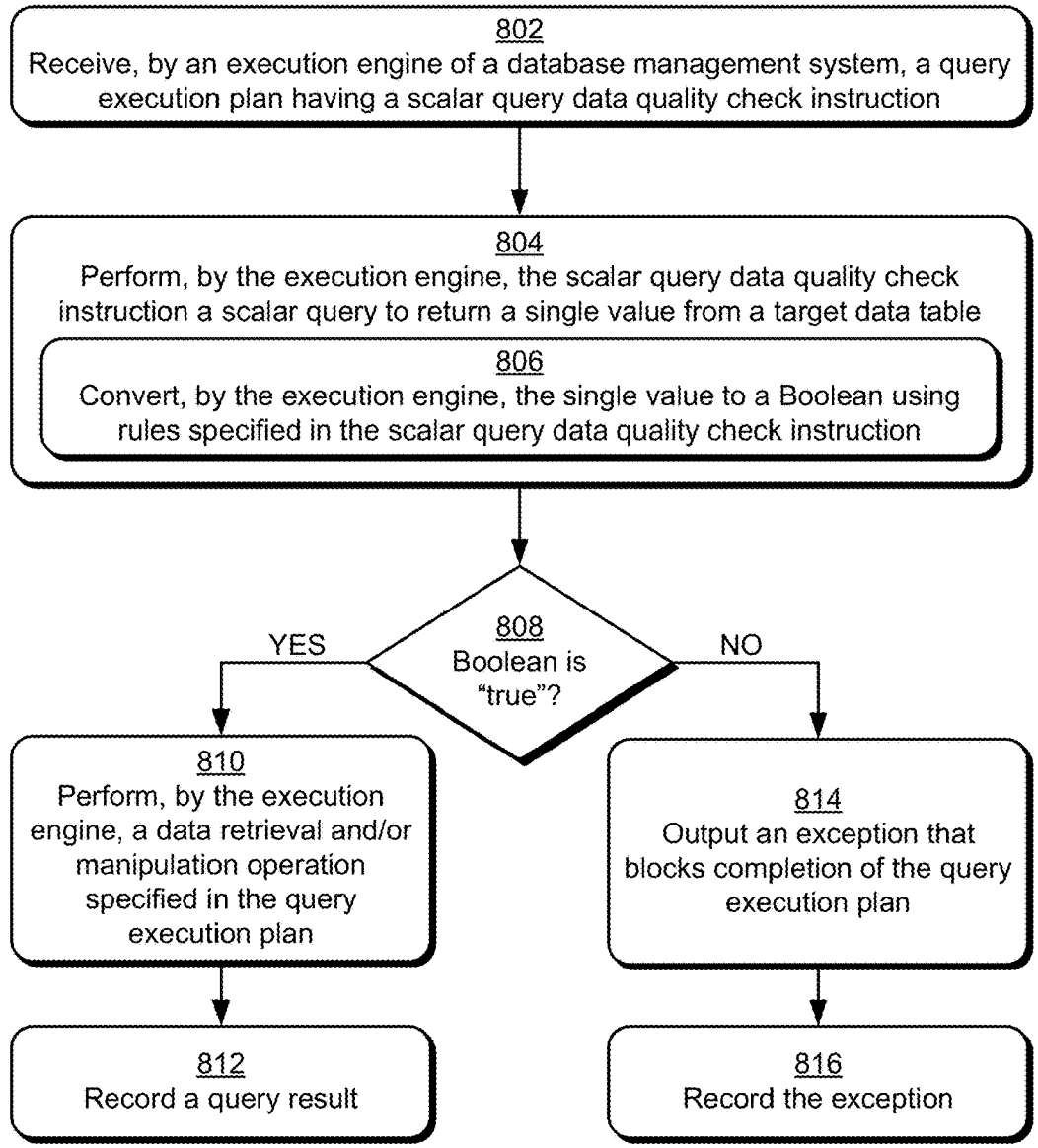
FIG. 8 is a flow diagram depicting an algorithm as a step-by-step procedure in an example of implementing a data quality check including a scalar subquery while executing a database query.

FIG. 8 is a flow diagram depicting an algorithm as a step-by-step procedure 800 in an example of implementing a data quality check including a scalar subquery while executing a database query. In at least one implementation, the procedure 800 is performable by a database management system (e.g., the database management system 114), including the query optimizer 138 and the execution engine 146. Moreover, the procedure 800 may performed as a part of the procedure 300 of FIG. 3, e.g., at block 312. Alternatively, the procedure 800 may be performed independently from the procedure 300. It is to be appreciated that the database management system 114 may implement a scalar query data quality check by executing operations that differ from those described below without departing from the scope of the present disclosure.

A query execution plan having a scalar query data quality check instruction is received by an execution engine of a database management system (block 802). By way of example, the execution engine 146 receives the query execution plan 224 having the data quality check 226 from the query optimizer 138, such as described above with respect to FIGS. 2 and 3. In the example procedure 800, the data quality check 226 corresponds to the scalar query instruction 222. Continuing with the present example, the scalar query instruction 222 includes logic for performing any subquery or calculation that returns a single value (e.g., a scalar), such as a minimum function, a maximum function, an average function, or a data retrieval function.

The scalar query data quality check instruction is performed by the execution engine to return a single value from a target data table (block 804). In accordance with the described techniques, performing the scalar query data quality check instruction includes covering, by the execution engine, the single value to a Boolean using rules specified in the scalar query data quality check instruction (block 806). By way of example, the scalar query data quality check instruction may include one or more operators for executing the specified subquery (e.g., the calculation or data retrieval that returns the single value), operators for converting the single value to the Boolean, and a constraint to check if the Boolean is "true." In one or more implementations, the subquery and/or the rules for converting the single value to the Boolean are programmed via the database management user interface 148. Moreover, the target data table may be identified via an operator that specifies a table name, e.g., the first data table 130(1) or another table of the database 128. As such, execution of the Boolean constraint (e.g., by the execution engine 146) may block completion of the remaining operator(s) of the query execution plan 224 if the Boolean is "false" or enable completion of the remaining operator(s) of the query execution plan 224 if the Boolean is "true," as will be elaborated below.

It is determined if the Boolean is "true" (block 808). The Boolean is either "true" (e.g., a first value, such as one) or "false" (e.g., a second value, such as zero), and thus, the single value is determined to be "true" or "false" according to a condition of the rules. As a non-limiting example, the rules may define "true" as a value greater than a pre-defined threshold value (e.g., zero or a non-zero value), as set via the parameters 154. As other non-limiting examples, the rules may define "true" as a value less than the pre-defined threshold value or as a value that is equal to the pre-defined threshold value. As still another non-limiting example, the rules may define "true" as a value within a pre-determined threshold range. The Boolean is "false" if the condition of the rules is not satisfied. Thus, in the present example, the constraint (e.g., condition) of the data quality check 226 includes the Boolean being "true."

If the Boolean is "true," a data retrieval and/or manipulation operation specified in the query execution plan is performed by the execution engine (block 810). By way of example, because the Boolean is "true," the condition of the data quality check 226 is satisfied, and the remaining operator(s) of the query execution plan 224 are executed by the execution engine 146, such as described above with respect to block 320 of FIG. 3.

A query result is recorded (block 812). By way of example, the query result 232, such as the selected data, results of the data manipulation operations, and/or a report of the operations performed by the execution engine 146, are stored in memory so that the query result 232 may be accessed by a user and/or the one or more application domains 120 that submitted the query 136.

Conversely, if the Boolean is not "true" (e.g., the Boolean is "false") an exception is output that blocks completion of the query execution plan (block 814). By way of example, because the constraint is "false" (e.g., the rules return a "false" value), the condition of the data quality check 226 is not satisfied, and the remaining operator(s) of the query execution plan 224 are not executed by the execution engine 146. Instead, the exception 236 may provide instructions for recording the failure of the query 136 and/or remediating the data quality issue.

The exception is recorded (block 816). By way of example, the exception 236 is recorded in a data table of the database 128 or in another database. Moreover, the data table may be output via the database management user interface 148 and displayed via the display device 152 so that an administrator of the database management system 114 is alerted to the exception 236.

Example System and Device

Figure 9:
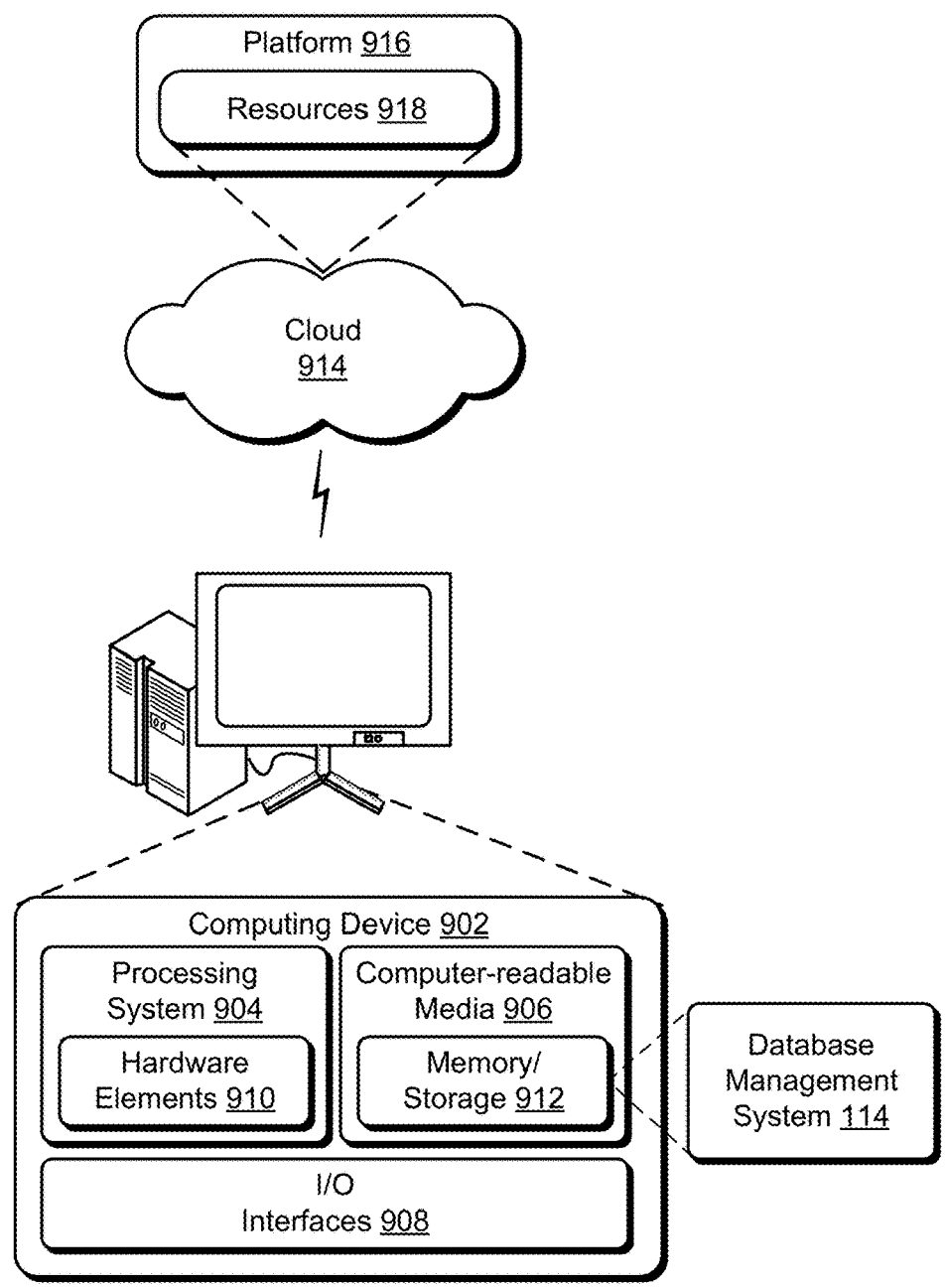
FIG. 9 illustrates an example system including various components of an example device that can be implemented as any type of computing device as described and/or utilized with reference to FIGS. 1-8 to implement embodiments of the techniques described herein.

FIG. 9 illustrates an example of a system generally at 900 that includes an example of a computing device 902 that is representative of one or more computing systems and/or devices that may implement the various techniques described herein. This is illustrated through inclusion of the database management system 114. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 906 is illustrated as including memory/storage 912. The memory/storage 912 represents memory/storage capacity associated with one or more computer-readable media. The memory/storage 912 may include volatile media (such as random-access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information thereon, such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
    receiving, by a query optimizer of a database management system, a data quality check hint as part of a database query statement for a database query of a database;
    retrieving, by the query optimizer, a data quality check instruction from a plurality of stored data quality check instructions based on the data quality check hint, the data quality check instruction defining a condition that differentiates reliable data stored in the database from unreliable data stored in the database;
    modifying, by the query optimizer, a query execution plan for the database query based on the data quality check instruction so that completion of the database query while executing the query execution plan is dependent on the condition defined by the data quality check instruction; and
    executing, by the database management system, the modified query execution plan by:
        completing the database query and returning query results in response to the condition being satisfied; and
        generating an exception that blocks completion of the database query in response to the condition not being satisfied, the exception further including at least of one of logging the condition not being satisfied, rolling back an operation, and communicating a reason for the condition not being satisfied.

2. The method of claim 1, wherein the modifying, by the query optimizer, the query execution plan for the database query based on the data quality check instruction so that the completion of the database query while executing the query execution plan is dependent on the condition defined by the data quality check instruction comprises inserting, by the query optimizer, logic into the query execution plan corresponding to the condition.

3. The method of claim 1, wherein the data quality check instruction comprises programmable variables.

4. The method of claim 1, wherein the data quality check instruction is selected by the query optimizer from the plurality of stored data quality check instructions based on a context of the database query statement.

5. The method of claim 1, wherein the condition of the data quality check instruction includes identifying a record in a target data table of the database, and wherein:
    completing the database query and returning the query results is in response to identifying the record in the target data table; and
    generating the exception that blocks completion of the database query is in response to not identifying the record in the target data table.

6. The method of claim 1, wherein the condition of the data quality check instruction includes an absence of duplicate records in a target data table of the database, and wherein:
    completing the database query and returning query results is in response to the absence of the duplicate records in the target data table; and
    generating the exception that blocks completion of the database query is in response to the duplicate records being present in the target data table.

7. The method of claim 1, wherein the database query comprises a join of two target data tables in the database, the condition of the data quality check instruction includes a join result of the two target data tables not including duplicate records, and wherein:
    completing the database query and returning query results is in response to the join result of the two target data tables not including the duplicate records; and
    generating the exception that blocks completion of the database query is in response to the join result of the two target data tables including the duplicate records.

8. The method of claim 1, wherein the database query comprises a join of two target data tables in the database, the condition of the data quality check instruction includes overlapping records of the two target data tables, and wherein:
    completing the database query and returning query results is in response to the overlapping records being present in the two target data tables; and
    generating the exception that blocks completion of the database query is in response to not identifying the overlapping records.

9. The method of claim 1, wherein the data quality check instruction is a scalar query, the condition of the data quality check instruction includes a first Boolean value, and wherein:
    completing the database query and returning query results is in response to a result of the scalar query converting to the first Boolean value; and
    generating the exception that blocks completion of the database query is in response to the result of the scalar query converting to a second Boolean value.

10. The method of claim 1, wherein the data quality check instruction is a subquery of the database query.

11. A method comprising:
    receiving, by a query optimizer of a database management system, a database query statement for a database query of a database;

identifying, by the query optimizer, a data quality check hint in the database query statement;

retrieving, by the query optimizer, a data quality check instruction from a plurality of stored data quality check instructions based on the data quality check hint, the data quality check instruction defining a condition that differentiates reliable data stored in the database from unreliable data stored in the database;

generating, by the query optimizer, a query execution plan for the database query statement based on the data quality check instruction so that completion of the database query via the query execution plan is dependent on satisfying the condition defined by the data quality check instruction; and executing, by the database management system, the query execution plan by:

completing the database query and returning query results in response to the condition being satisfied; and generating an exception that blocks completion of the database query in response to the condition not being satisfied, the exception further including at least of one of logging the condition not being satisfied, rolling back an operation, and communicating a reason for the condition not being satisfied.

12. The method of claim 11, wherein the generating, by the query optimizer, the query execution plan for the database query based on the data quality check instruction so that completion of the query execution plan is dependent on satisfying the condition defined by the data quality check instruction comprises inserting, by the query optimizer, logic into the query execution plan corresponding to the condition.

13. The method of claim 11, wherein the condition is selected by the query optimizer based on a keyword in the data quality check hint.

14. The method of claim 11, wherein the condition is one of a presence of a target record in a target data table of the database, an absence of duplicate records in the target data table, a shared reference in two target data tables, and a scalar query resulting in a desired binary value.

15. The method of claim 1, wherein the unreliable data includes data stored in the database that is at least one of inaccurate, incomplete, inconsistent, and invalid.

16. The method of claim 1, wherein the database query statement defines at least one data retrieval operation to be performed on data stored in the database during the database query, and wherein generating the exception in response to the condition not being satisfied blocks the at least one data retrieval operation.

17. The method of claim 1, wherein the database query statement defines at least one data manipulation operation to be performed on data stored in the database during the database query, and wherein generating the exception in response to the condition not being satisfied blocks the at least one data manipulation operation.

\* \* \* \* \*